United States Patent [19]

Vogt

[11] 4,054,969

[45] Oct. 25, 1977

[54] FISHING TOOL

[76] Inventor: James E. Vogt, 400 Friedens Road, St. Charles, Mo. 63301

[21] Appl. No.: 647,353

[22] Filed: Jan. 8, 1976

[51] Int. Cl.$^2$ ............................................. A22C 25/00
[52] U.S. Cl. ........................................................ 17/68
[58] Field of Search ................ 17/68, 66, 69; 81/300, 81/418, 428

[56] References Cited

U.S. PATENT DOCUMENTS

| 2,810,154 | 10/1957 | Wisenhoffer | 17/68 |
| 3,088,165 | 5/1963 | Bellis | 17/68 |
| 3,163,885 | 1/1965 | Dumas et al. | 17/68 |
| 3,771,197 | 11/1973 | Heuer, Sr. | 17/68 |

Primary Examiner—Louis G. Mancene
Assistant Examiner—Robert F. Cutting
Attorney, Agent, or Firm—Gravely, Lieder & Woodruff

[57] ABSTRACT

This disclosure concerns a utility tool for removing skin from fishes, particularly catfish. The tool has a generally pliers-like configuration with a flat underblade with a sharpened edge and a curved upper blade which comes into engagement with the underblade adjacent to the sharpened edge. The sharpened edge is used to loosen the skin and the skin is then gripped between the curved blade and the flat blade and pulled from the flesh of the fish.

7 Claims, 6 Drawing Figures

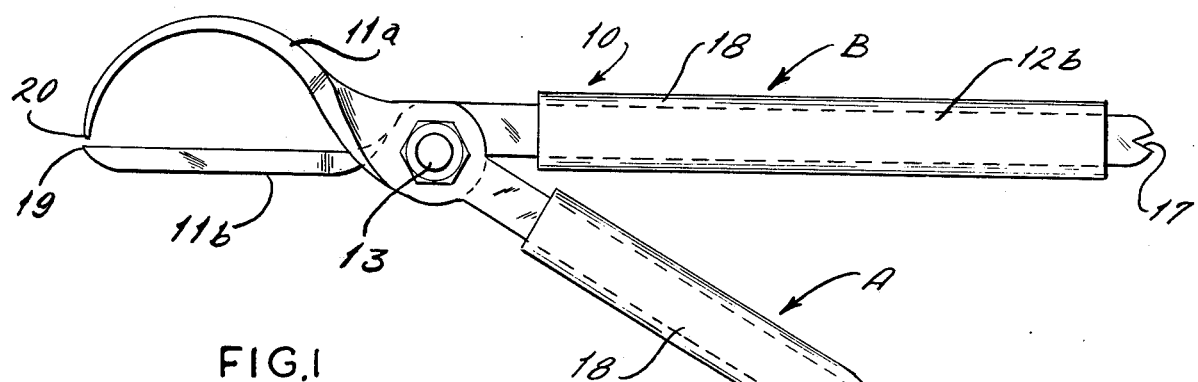
FIG.1
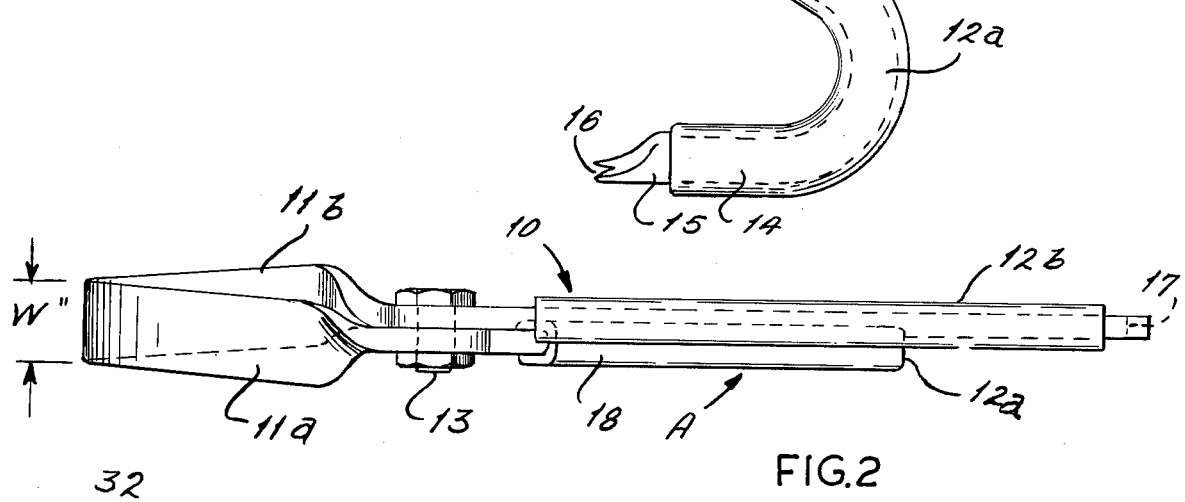
FIG.2
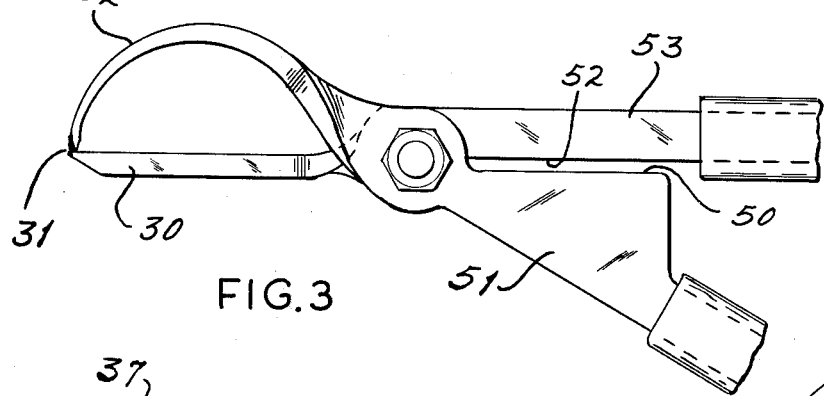
FIG.3
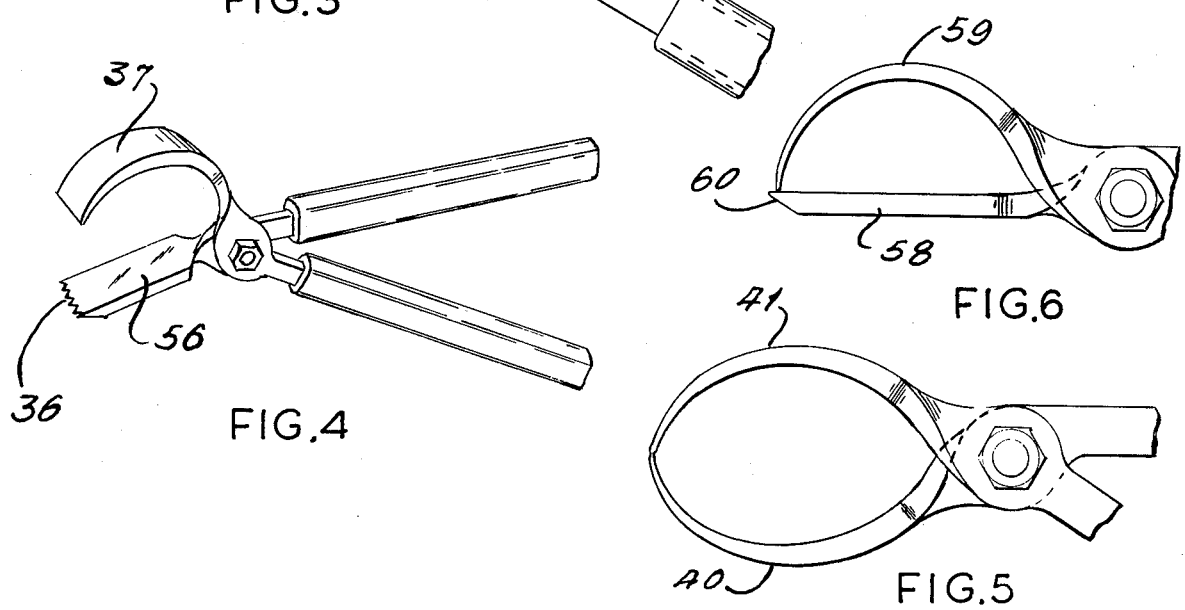
FIG.4
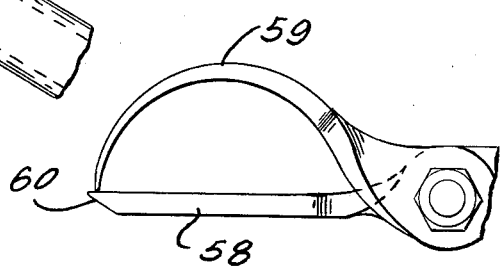
FIG.6
FIG.5

FISHING TOOL

BACKGROUND OF THE INVENTION

This invention relates to fishing and particularly to cleaning fish and specifically to skinning catfish.

Catfish have a tough, difficult to remove skin that is significantly different from the skin of other fish, in that there are no scales covering the skin. It is desirable to remove the skin of catfish before cooking and eating the fish as the skin is of poor quality, is quite tough, and may affect the taste of the fish.

It is a principal object of this invention to provide a fast, efficient tool for use in removing the skin of fish, particularly catfish. It is another object of this invention to provide a utility tool which can be used in fishing and which has special jaws adapted to the skinning of fish. Still another object of this invention is to provide a pliers-like fishing tool which has a flat sharpened lower jaw for loosening the edge of the skin to be removed, and an aligned upper jaw for engaging the lower jaw in a linear contact to grip the skin for easy removal.

A further object is to provide a utility tool having fish skinning jaws in combination with a hook disengaging member and mating surfaces for squeezing material therebetween.

A still further object is to provide a utility pliers with a curved handle which is notched to provide a nail pulling arrangement. These and other objects and advantages will become apparent hereinafter.

SUMMARY OF THE INVENTION

The present invention comprises a tool having a flat underblade with a sharpened edge, and a curved upper blade which has a sharpened or rounded edge to engage the underblade adjacent to the end for gripping the skin of a fish therebetween to remove the skin from the fish. Other aspects of the invention include a notched handle for removing hooks from the mouth of the fish, engaging jaws for squeezing a split shot sinker, and a nail pulling configuration of one handle.

BRIEF DESCRIPTION OF THE DRAWINGS

In the drawings wherein like numbers refer to like parts wherever they occur:

FIG. 1 is a side elevational view of a tool embodying the present invention;

FIG. 2 is a top plan view of the tool of FIG. 1;

FIG. 3 is a fragmentary side elevational view showing a modification of the present invention;

FIG. 4 is a perspective view showing another modification of the present invention;

FIG. 5 is a fragmentary view showing a modification of the present invention; and FIG. 6 is a fragmentary view showing a further modification of the present invention.

DETAILED DESCRIPTION

The present invention comprises a utility tool 10 as shown in FIGS. 1 and 2, preferably in the form of a pair of pliers. The tool 10 comprises two pivotally connected members "A" and "B" which have jaw portions 11a and 11b and handle portions 12a and 12b. The members A and B are connected intermediate of their ends at a pivot point 13. The pivot 13 can be a nut and bolt type as shown, or it can be any conventional form of pivot, including a rivet which passes through openings in the members A and B with the rivet being upset and ground off, or either member can be threaded with the bolt extending through one part and threading into the second part, etc.

In the preferred embodiment, one of the handles 12 has a curved portion 14 adjacent to its free end. However, if desired, both of the handle portions 12a and 12b can be straight or both can be curved. The curved handle 12a has a 90° rolled section 15 provided with a notch 16 for use as a nail puller. The straight handle 12b is provided with a notch 17 which is useful for inserting into the mouth of a fish to disengage a hook which may be stuck in the mouth of the fish or further down in the throat of the fish. As shown, the handles 12a and 12b are provided with plastic or rubber handle coatings 18, but the handles can be bare metal if desired.

The jaw members 11a and 11b as shown include a lowerjaw member 11b which is flat and has substantial width "W" as shown in FIG. 2 sufficient to grasp a fish skin and not tear the skin. The flat jaw 11b preferably has a knife-like edge 19 used to initiate the removal of the skin from the fish. The knife edge 19 of the jaw 11b is inserted beneath the skin of the fish at the point where the skin is cut around the head of the fish to start removal of the skin.

The opposed aligned upper jaw 11a preferably is curved as shown in FIG. 1 with the leading edge 20 coming into engagement with the lower jaw 11b adjacent to the knife edge 19. Preferably, the edge 20 of the upper jaw 11a is of the same width as the lower jaw 11b and has a slightly rounded edge so as not to cut the skin of a fish when the skin is grasped between the jaws 11a and 11b.

FIGS. 3-6 show modifications of the jaw arrangement. In FIG. 3 is shown a construction in which the upper jaw 32 is curved and blunt at its end 31 and the lower jaw 30 is flat and sharpened so that it may be inserted beneath the skin of the fish.

FIG. 4 shows a modification in which the lower jaw 35 is flat and has a serrated edge 36. The upper jaw 37 is curved and has a slightly rounded edge or a blunt edge.

FIG. 5 shows a modification in which both the lower jaw 40 and the upper jaw 41 are curved.

FIG. 6 shows a modification of the jaw arrangement in which the flat lower jaw 58 is extended beyond the curved jaw 59. This modification will allow the sharpening of the flat jaw 58 if it becomes dull from use without interferring with the usefulness of this invention. The sharpened lower jaw 58 is inserted beneath the skin of the fish and the upper jaw 59 (which preferably is slightly rounded on its edge) is used to grip the skin against the lower jaw 58.

In any of the configurations shown one or both of the jaws can have a knife-like edge or a serrated edge.

A further embodiment of the invention is shown in FIG. 4 in which there is shown a shoulder 50 on one of the handles 51 aligned with a flattened section 52 of the other handle 53 so that when the handles 51 and 53 move together, the lower handle shoulder 50 acts like an anvil and the flattened portion 52 of the upper handle 53 acts as a striker so as to crush anything therebetween. This is useful for squeezing together split shot and the like while fishing.

In use of this utility tool, the sharpened blade edge 19 (FIG. 1) is inserted beneath the skin of the fish at the point where the skin is cut around the head of the fish. The said blade enters at approximately 45° angle with the sharpened edge 19 facing toward the tail of the fish. The edge of the skin is loosened using the edge 19.

Thereafter, the pliers 10 are gripped in the hand of the user, and the upper blade 11a closes to engage the skin and retain it between the lower blade 11b and the upper blade 11a at the outer edges 19 and 20. The skin is engaged in an essentially linear contact along a substantial width and is pulled from the fish by moving the tool toward the tail of the fish. The linear contact of the jaws 11a and 11b prevents the skin from tearing out and the tool from pulling away and tearing the skin.

What is claimed is:

1. A tool for removing skin from fish comprising
   a. first and second members each having jaw and handle portions, and
   b. pivot means connecting the two members intermediate the jaw and handle portions,
   c. the first of said members having the jaw portion and handle portion in substantial alignment through the pivot,
   d. the second of said members having a convexly curved jaw portion with a straight handle portion in substantial alignment and tangent to one end of the convexly curved jaw, the free end of said convexly curved jaw member engaging the free end of the first jaw member,
   e. the handle portions being angularly diverging from the pivot whereby a rearward pull on the handles will urge the jaw members together,
   f. said jaw members having substantial width to grip the skin of the fish in a substantial linear engagement at the said free ends.

2. The tool of claim 1 wherein the leading edge of the flat blade is sharpened.

3. The tool of claim 2 wherein the edge of the flat blade extends outwardly of the area of engagement with the leading edge of the curved blade.

4. The tool of claim 1 including a notch in one of the handles for removing fishhooks from the mouth or throat of a fish.

5. The tool of claim 1 including a curved portion on the end of one of the handles, said curved portion having a notch in the end for removing nails.

6. A tool for removing skin from fish comprising
   a. first and second members each having jaw and handle portions, and
   b. pivot means connecting the two members intermediate the jaw and handle portions,
   c. the first of said members having the jaw portion and handle portion in substantial alignment through the pivot,
   d. the second of said members having a convexly curved jaw portion with a straight handle portion in substantial alignment and tangent to one end of the convexly curved jaw, the free end of said convexly curved jaw member engaging the free end of the first jaw member, and
   e. a crushing device formed on said handles behind the said pivot means,
   f. said jaw members having substantial width to grip the skin of the fish in a substantial linear engagement at the said free ends.

7. The tool of claim 6 wherein the crushing device comprises a flattened section the first member handle portion adjacent to the pivot and a striker shoulder on the second member aligned with the said flattened section and positioned adjacent to the pivot so that as the jaws move together, the flattened section and the striker shoulder move into engagement to squeeze items placed therebetween.

* * * * *